(12) United States Patent
Chen

(10) Patent No.: US 7,566,043 B2
(45) Date of Patent: Jul. 28, 2009

(54) ANGLE REGULATOR AND EQUIPMENT WITH THE ANGLE REGULATOR

(75) Inventor: Yen-Chih Chen, Tu-Cheng (TW)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/959,228

(22) Filed: Dec. 18, 2007

(65) Prior Publication Data
US 2009/0101789 A1   Apr. 23, 2009

(30) Foreign Application Priority Data
Oct. 19, 2007   (CN) .......................... 2007 1 0123984

(51) Int. Cl.
*F16M 13/00* (2006.01)
(52) U.S. Cl. ................. 248/616; 248/188.8; 248/188.2; 248/677; 248/354.7; 361/683; 400/691
(58) Field of Classification Search ................. 248/615, 248/616, 188.8, 188.2, 188.5, 677, 688, 354.7; 361/683, 680; 400/691, 472; 108/7, 9
See application file for complete search history.

(56) References Cited

U.S. PATENT DOCUMENTS

| | | | | |
|---|---|---|---|---|
| 780,979 A * | 1/1905 | Correll | ..................... | 254/84 |
| 4,516,508 A * | 5/1985 | Kako et al. | ..................... | 108/7 |
| 4,658,124 A * | 4/1987 | Bertina | .................... | 235/145 R |
| 4,735,394 A * | 4/1988 | Facco | .......................... | 248/653 |
| 4,856,748 A * | 8/1989 | Obermeyer | .................. | 248/688 |
| 5,111,361 A * | 5/1992 | Kobayashi | .................... | 361/683 |
| 5,297,003 A * | 3/1994 | Nomura et al. | ............. | 361/680 |
| 5,347,424 A * | 9/1994 | Akahane | ...................... | 361/680 |
| 5,469,327 A * | 11/1995 | Cheng | ........................ | 361/680 |
| 6,053,589 A * | 4/2000 | Lin | ............................. | 312/271 |
| 6,097,592 A * | 8/2000 | Seo et al. | ...................... | 361/683 |
| 6,302,543 B1 * | 10/2001 | Arai et al. | ...................... | 353/70 |
| 6,682,240 B1 * | 1/2004 | Chou | ........................... | 400/691 |
| 7,111,948 B2 * | 9/2006 | Lee et al. | ..................... | 353/119 |
| 7,178,768 B2 * | 2/2007 | Inoue | ......................... | 248/188.4 |
| 7,234,676 B2 * | 6/2007 | Chen et al. | .................... | 248/677 |
| 2002/0139909 A1 * | 10/2002 | Oyama et al. | ............. | 248/188.8 |
| 2004/0060687 A1 | 4/2004 | Moss, II | | |

* cited by examiner

*Primary Examiner*—Anita M King
(74) *Attorney, Agent, or Firm*—Frank R. Niranjan

(57) ABSTRACT

An angle regulator (10) includes an outer shell (14) having a deflecting arm (146) and an inner supporting pole (15) received in the outer shell. The deflecting arm includes a main rod (1464), and a press-button (1462) and a hook (1466) respectively located at two opposite ends of the main rod. The press-button extends from the main rod and protrudes out of the outer shell. A plurality of spaced grooves (156) are defined in the inner supporting pole along an axial direction thereof. When the press-button is pressed, the hook is detached from one of the grooves that is engaged with the hook such that the inner supporting pole can slide with respect to the outer shell, and when the press-button is released, the hook is selectively engaged in another one of the grooves so that the inner supporting pole and the outer shell are fixed to each other.

14 Claims, 5 Drawing Sheets

ANGLE REGULATOR AND EQUIPMENT WITH THE ANGLE REGULATOR

BACKGROUND OF THE INVENTION

1. Field of the Invention

The present invention relates generally to angle regulators, and more particularly to an angle regulator assembled with an equipment to support the equipment with an inclined angle and to adjust the inclined angle to assume various angles towards an equipment user for improving ergonomics. The present invention also relates to an equipment with the angle regulator.

2. Description of Related Art

With the continued development of computer technology, various computers such as notebook computers or desktop computers are widespreadly used in all trades and occupations. The notebook computer and the keyboard of the desktop computer are generally putted horizontally on a table when using, a top surface of the table and a bottom of the notebook computer or the keyboard of the desktop computer are always fully contacted to each other, which tends to make users become fatigued easily for holding a same posture for a long time. Thus, an angle regulator is typically used to support a rear side of the notebook computer or the keyboard of the desktop computer to depart from the top surface of the table and thus to form an angle therebetween. However, the angle regulator can only provide a constant angle, a magnitude of which cannot be changed freely according to different requirements of users. The designs are not ergonomic for the users.

For the foregoing reasons, therefore, it is desired to devise an angle regulator which can overcome the above-mentioned problems.

SUMMARY OF THE INVENTION

The present invention relates, in one aspect, to an angle regulator for adjusting an angle between an equipment and a supporting surface on which the equipment is rested. According to a preferred embodiment of the present invention, the angle regulator includes an outer shell having a deflecting arm and an inner supporting pole received in the outer shell. The deflecting arm includes a main rod, and a press-button and a hook respectively located at two opposite ends of the main rod. The press-button extends from the main rod and protrudes out of the outer shell. A plurality of spaced grooves are defined in the inner supporting pole along an axial direction thereof and are engageable with the hook. When the press-button is pressed, the hook is detached from one of the grooves that is engaged with the hook such that the inner supporting pole can slide with respect to the outer shell, and when the press-button is released, the hook is selectively engaged in another one of the grooves so that the inner supporting pole and the outer shell are fixed to each other.

The present invention relates, in another aspect, to assembly including an equipment with an angle regulator. According to a preferred embodiment of the present invention, the assembly includes an equipment and at least one angle regulator pivotably attached to the equipment. The equipment defines at least one slot in a bottom surface thereof. The at least one angle regulator is capable of pivoting with respect to the equipment from a closed position at which the at least one angle regulator is received in the at least one slot, to an opened position at which the at least one angle regulator is raised from the at least one slot for engaging with a supporting surface on which the equipment is rested to define an angle between the supporting surface and the equipment. The at least one angle regulator includes an outer shell having a deflecting arm and an inner supporting pole received in the outer shell. A plurality of spaced grooves are defined in the inner supporting pole along an axial direction thereof. The deflecting arm includes a main rod, and a press-button and a hook respectively located at two opposite ends of the main rod. The press-button extends from the main rod and protrudes out of the outer shell. The hook is engageable with the grooves. When the press-button is pressed, the hook is detached from one of the grooves that is engaged with the hook such that the inner supporting pole can slide with respect to the outer shell to adjust a length of the at least one angle regulator, and when the press-button is released, the hook is selectively engaged in another one of the grooves so that the inner supporting pole and the outer shell are fixed to each other.

Other advantages and novel features of the present invention will become more apparent from the following detailed description of preferred embodiment when taken in conjunction with the accompanying drawings, in which:

DETAILED DESCRIPTION OF THE INVENTION

Figure 1:
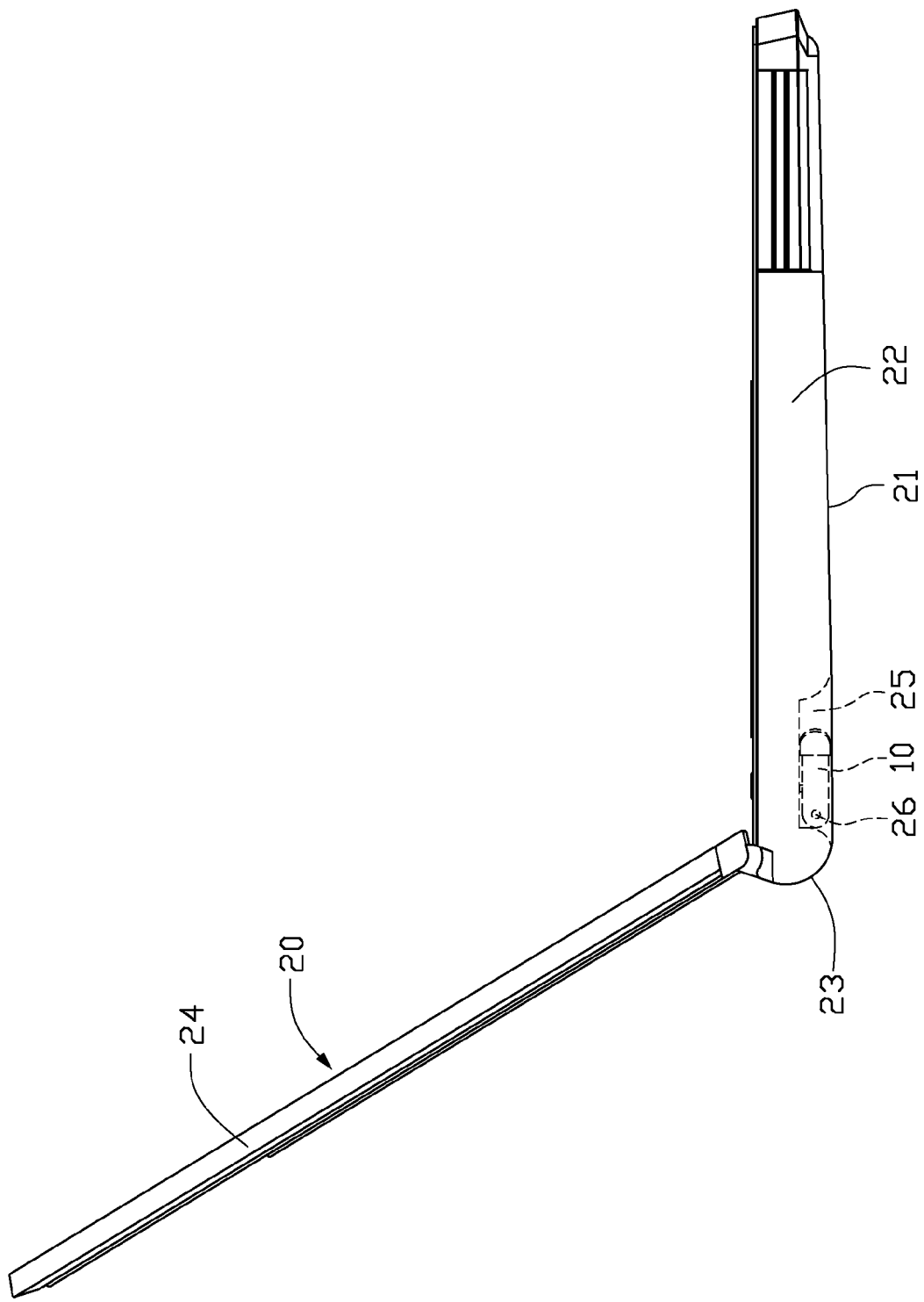
FIG. 1 is a side view of a notebook computer assembled with two angle regulators according to a preferred embodiment of the present invention, as shown in a closed position wherein the angle regulators are received in the notebook computer.
Figure 2:
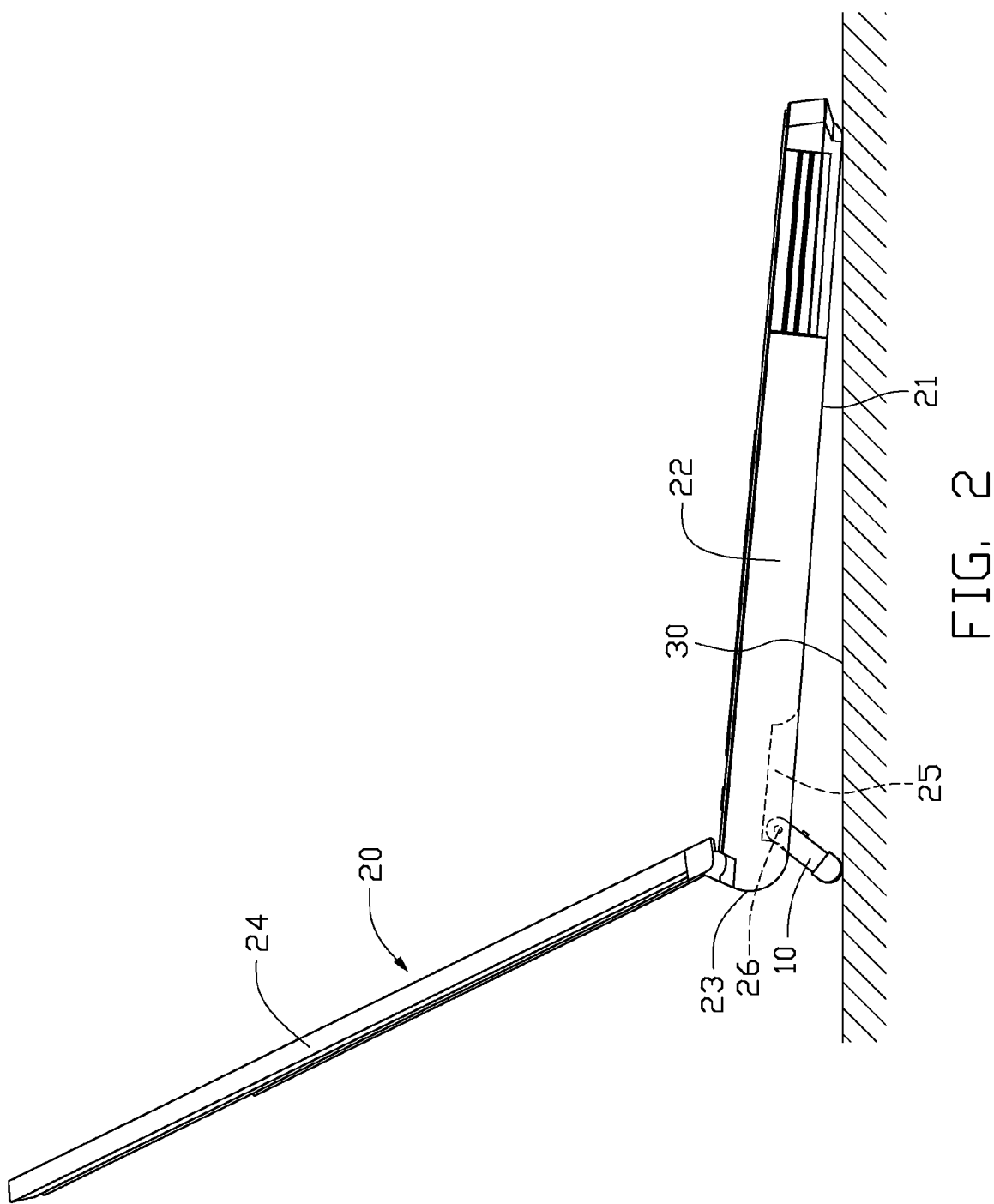
FIG. 2 is a side view of the notebook computer of FIG. 1, as shown in an opened position wherein the angle regulators are in a supporting state for providing an inclined angle.

The present invention relates to an angle regulator whose length can be adjusted according to needs of different users, and an equipment with such an angle regulator. Referring to FIG. 1 and FIG. 2, an angle regulator 10 in accordance with a preferred embodiment of the present invention is designed to attach to a bottom surface 21 of a notebook computer 20 for providing an inclined angle towards the users for improving viewing and ergonomics. The notebook computer 20 is placed horizontally on a supporting surface 30 and includes a main body 22, a screen 24 pivotably connected to a lateral rear side of the main body 22 and two angle regulators 10 mounted to the bottom surface 21 of the main body 22. From the user's view, the two angle regulators 10 are respectively located at a left side and a right side of the main body 22 symmetrically, wherein only one angle regulator 10 is visible in FIG. 1 and FIG. 2 since FIGS. 1 and 2 are both side views of the notebook computer 20. The two angle regulators 10 are located adjacent to a rear end 23 of the notebook computer 20. When the two angle regulators 10 are both received in the notebook computer 2 in a closed position (as shown in FIG. 1), the bottom surface 21 of the notebook computer 20 is fully contacted with the supporting surface 30. When the two angle regulators 10 are raised in a supporting state, i.e., in an opened position (as shown in FIG. 2), the rear end 23 of the notebook computer 20 is separated from the supporting surface 30, and a space is formed between the bottom surface 21 of the notebook computer 20 and the supporting surface 30. The angle regulators 10 support the notebook computer 20 in an inclined position towards users. In the figures, the angle regulators 10 are shown to be applied to a notebook computer to adjust an angle between the notebook computer and a platform on which the notebook computer is placed so that the users can use the notebook computer in a more comfortable way. It is understood that the angle regulators 10 can also be attach to a keyboard of a desktop computer for providing an inclined angle towards the users of the keyboard to improve human ergonomics.

The main body 22 of the notebook computer 20 encloses therein a heat generating electronic component, for example, a central processor unit (not shown). Typically, a thermal module (not shown) which may includes a metal fin assembly and a centrifugal fan, is disposed adjacent to the heat generating electronic component for dissipating heat generated thereby. Two slots 25 are defined in the bottom surface 21 of the main body 22 and located adjacent to the fan, which is contained in the main body 22 for dissipating heat from the CPU. The two slots 25 each may be set to communicate with an interior of the main body 22 so that the slots interconnect an inside of the main body 22 with an outside environment directly and function as two air outlets of the notebook computer 20, whereby the airflow generated by the fan inside the main body 22 can be advantageously discharged out of the main body 22 via the two air outlets. The two slots 25 are also located at the left side and the right side of the bottom surface 21 of the main body 22 symmetrically and used for receiving the two angle regulators 10 therein correspondingly. Each of the slots 25 is rectangle-shaped and fittingly receives a corresponding angle regulator 10 therein. A pivot 26 is formed at a rear end of each slot 25 for pivotably connecting with a corresponding angle regulator 10. During operation of the notebook computer 20, the heat generating electronic component such as the CPU, which is contained inside of the main body 22 generates substantial amount of heat. When an internal temperature of the main body 22 reaches a preset limit, the fan contained in the main body 22 is activated to generate an airflow. Since the two slots 25 interconnect the inside of the main body 22 with the outside environment, the airflow can flow to the outside environment from the inside of the main body 22 through the two slots 10 directly to decrease the internal temperature of the main body 22, whereby the heat generated by the CPU is taken away from the inside of the main body 22 more rapidly. Accordingly, in one aspect, the two slots 25 are used for receiving the two angle regulators 10 therein; in another aspect, the two slots 25 can function as two air outlets for the notebook computer 20.

Figure 3:
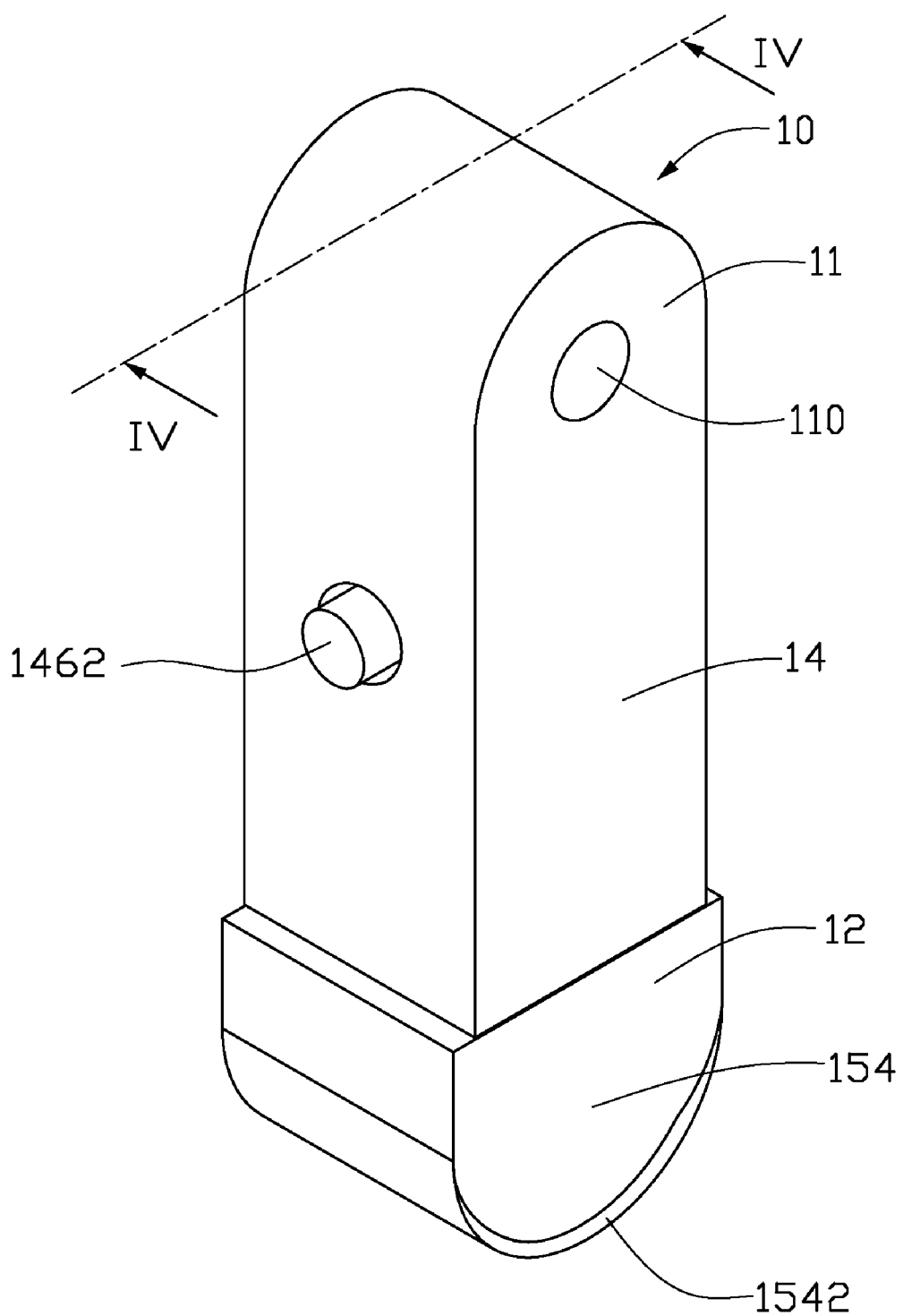
FIG. 3 is an enlarged, isometric view of the angle regulator of FIG. 1

Referring to FIG. 3, each of the angle regulators 10 includes a fixing end 11 and a free end 12 opposed to the fixing end 11. A pivot hole 110 is defined in the fixing end 11 of each angle regulator 10. The pivot hole 110 is defined for receiving the pivot 26 in a corresponding slot 25 therein. Thus, the angle regulators 10 can be connected to the pivot 26 in the slot 25 pivotably. That is to say, the free end 12 of the angle regulator 10 is pivotable with respect to the pivot 26 in the corresponding slot 25 so that the angle regulator 10 can be received in the corresponding slot 25 or raised from the slot 25 according to user's requirements.

Figure 4:
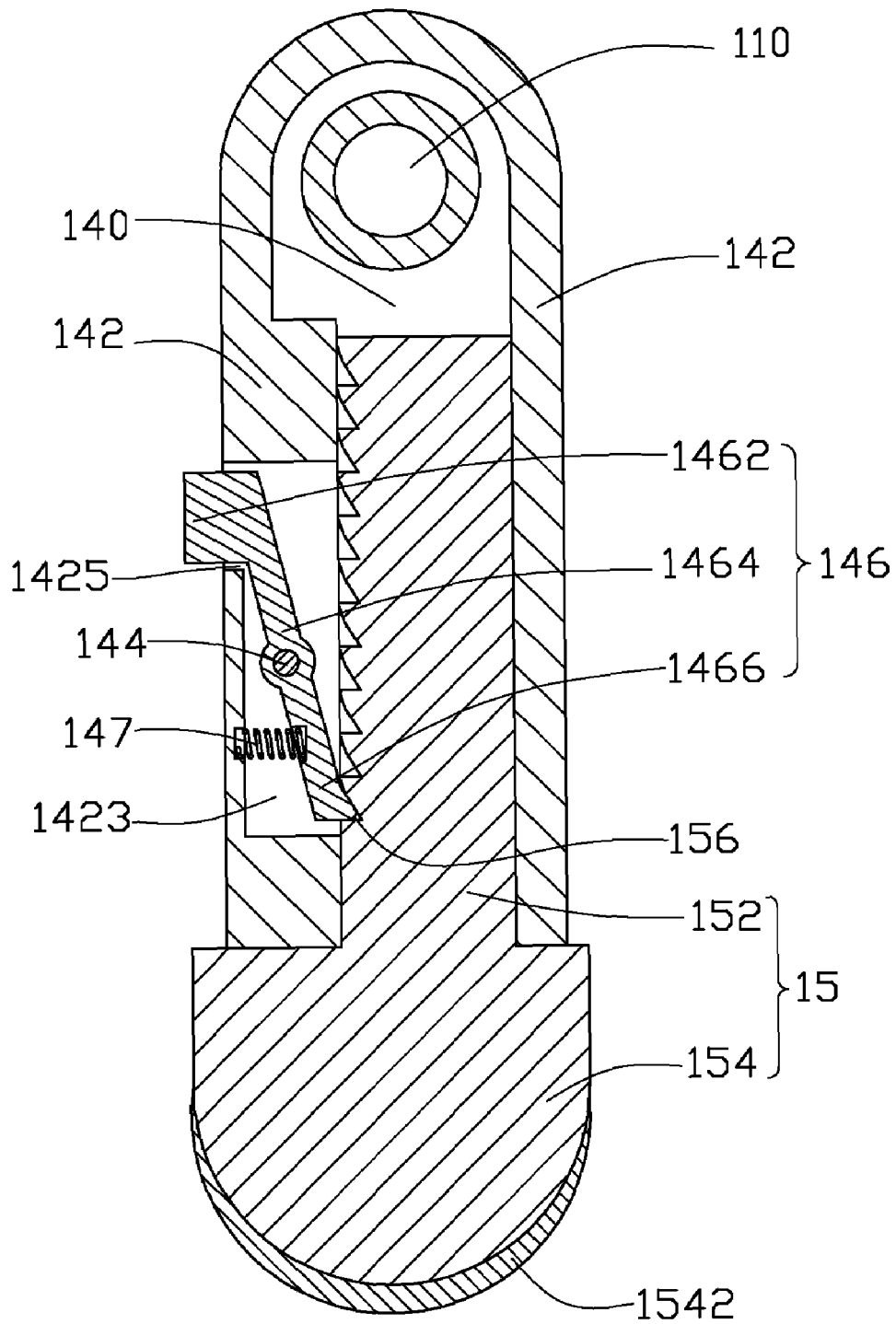
FIG. 4 is a cross-sectional view of the angle regulator, along line IV-IV from FIG. 3, to show an inner structure thereof, wherein an inner supporting pole and an outer shell of the angle regulator are firmly locked to each other.
Figure 5:
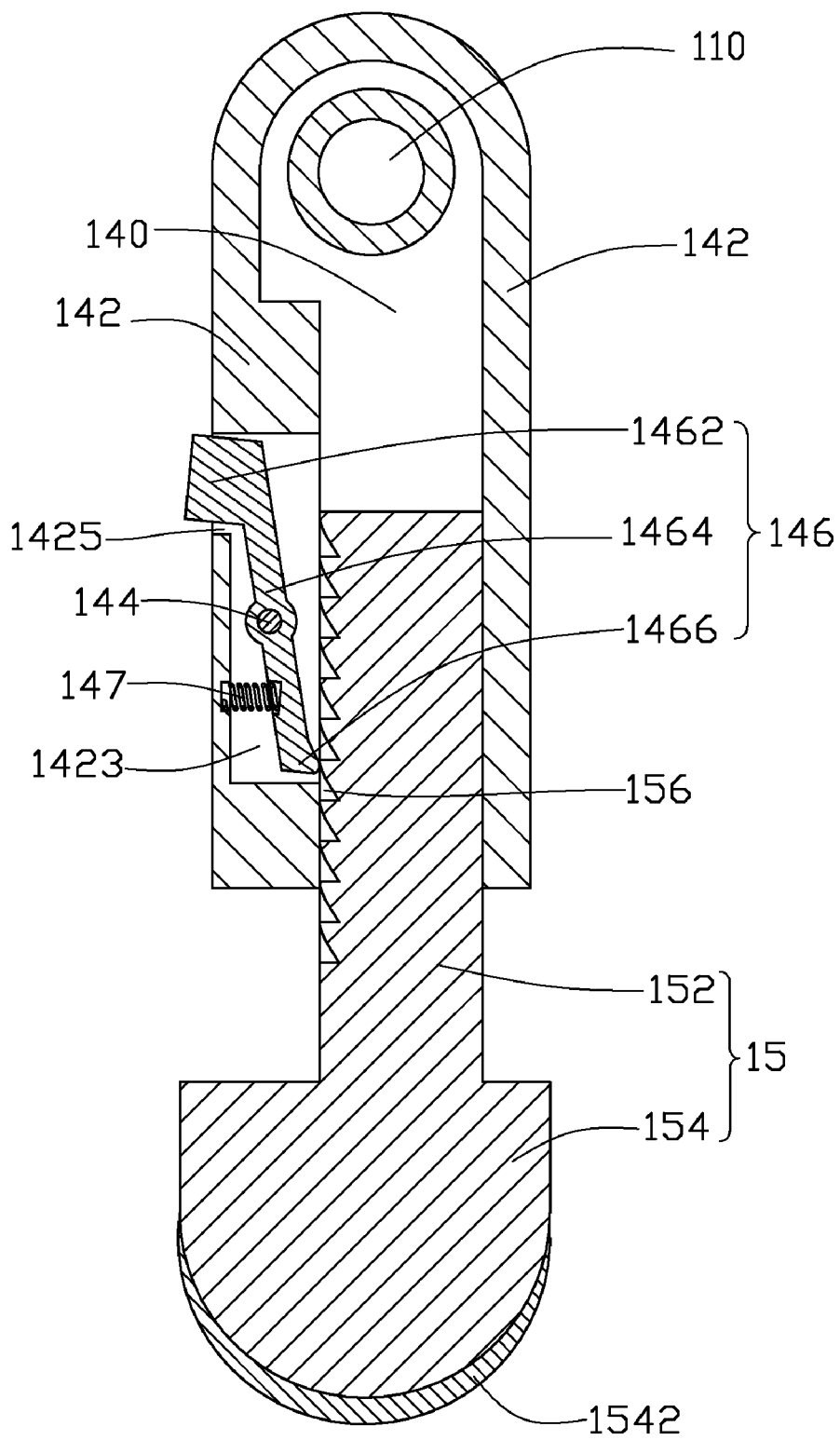
FIG. 5 is similar to FIG. 4, but showing that the inner supporting pole slides with respect to the outer shell to adjust a relative position therebetween.

Referring to FIG. 3 to FIG. 5, each of the angle regulators 10 includes an outer shell 14 and an inner supporting pole 15 received in the outer shell 14. A first square receiving space 140 is defined in an interior of the outer shell 14 for receiving the inner supporting pole 15 therein. The outer shell 14 includes four sidewalls 142 connected circumferentially together to define the receiving space 140, a fixing axle 144 protruding from an inner surface of a rear side sidewall 142 as viewed from FIG. 4 and a deflecting arm 146 pivotally connected to the fixing axle 144. As viewed from FIG. 4, a thickness of a left side sidewall 142 is larger than that of any one of the other sidewalls 142. A second square receiving space 1423 communicated with the first square receiving space 140 is defined in the thickened portion of the left side sidewall 142 for receiving the deflecting arm 146 therein. A circular hole 1425 is defined in the left side sidewall 142 of the outer shell 14 at a position corresponding to an upper end of the second receiving space 1423, wherein the first square receiving space 140 and the second square receiving space 1423 are both communicated with an outer environment of the outer shell 14 through the circular hole 1425. The deflecting arm 146 includes a main rod 1464, and a press-button 1462 and a hook 1466 extending from a top end and a bottom end of the main rod 1464 respectively. The main rod 1464 of the deflecting arm 146 is disposed inclined corresponding to the inner supporting pole 15, and the press-button 1462 and the hook 1466 extend horizontally from the top and bottom ends of the main rod 1464 towards two opposite horizontal directions, wherein the press-button 1462 is bent from the top end of the main rod 1464 and extends towards a direction where the circular hole 1425 is located, and the hook 1466 is bent from the bottom end of the main rod 1464 and extends towards a direction where the inner supporting pole 15 is located. A hole (not labeled) is defined in a middle portion of the main rod 1464 of the deflecting arm 146 for receiving the fixing axle 144 therein. The press-button 1462 is received in the circular hole 1425 of the left side sidewall 142 and an outer portion of the press-button 1462 protrudes out of the left side sidewall 142 of the outer shell 142 for facilitating operations. When the press-button 1462 is pressed or released, the deflecting arm 146 is capable of rotating clockwise or anti-clockwise around the fixing axle 144. An elastic member 147 is located between the main rod 1464 of the deflecting arm 146 and the left side sidewall 142 of the outer shell 14, wherein one end of the elastic member 147 is connected to a lower portion of the deflecting arm 146 between the fixing axle and the hook 1466, and the other end of the elastic member 147 is connected to the inner surface of the left side sidewall 142 of the outer shell 14. The elastic member 147 is in a compressed state and a spring is taken as an example of the elastic member 147 in the present embodiment.

The inner supporting pole 15 includes an linearly-shaped main post 152 and a supporting seat 154 formed in a bottom end of the main post 152. The main post 152 is received in the first square receiving space 140 of the outer shell 14, while the supporting seat 154 extends out of and is located under the outer shell 14. The supporting seat 154 has a larger size than the main post 152. A plurality of spaced grooves 156 are defined in one side surface of the main post 152 of the inner supporting pole 15 along an axial direction thereof. These grooves 156 face towards the deflecting arm 146 and each groove 156 is matched with the hook 1466 of the deflecting arm 146. The grooves 156 and the hook 1466 are confronted to each other such that the hook 1466 can be selectively received or engaged in one of the grooves 156 for firmly fastening the outer shell 14 and the inner supporting pole 15 to each other, thus making the angle regulator 10 have a fixed length. In this regard, the angle regulators 10 can have different lengths when the hook 1466 of the deflecting arm 146 is received in different grooves 156 along the axial direction of the inner supporting pole 15. An antiskid pad 1542 is formed on or attached to a bottom of the supporting seat 154 of the inner supporting pole 15. The antiskid pad 1542 is used for increasing a friction between the angle regulator 10 and the supporting surface 30 on which the notebook computer 20 is rested.

For the benefit of description and understanding, it is assumed that an initial state of the angle regulator 10 is illustrated in FIG. 4, and the working principle of a length adjusting process of the angle regulator 10 is described in details hereinafter. Referring to FIG. 4, when the angle regulator 10 is in the initial state, the supporting seat 154 of the inner supporting pole 15 is contacted with a bottom surface of the outer shell 14, the hook 1466 of the deflecting arm 146 is received in a lowest groove 156 defined in the inner supporting pole 15, and the spring 147 is in a compressed state and the angle regulator 10 has a shortest length. When it is needed to adjust the angle regulator 10 to have a longer length, firstly the user needs to unsnap the hook 1466 of the deflecting arm 146 from the lowest groove 156 of the inner supporting pole 15 by pressing the press-button 1462 of the deflecting arm 146 inwardly. The deflecting arm 146 pivots clockwise around the fixing axle 144 when subject to the external force acted on the press-button 1462 of the deflecting arm 146. As a result, the spring 147 is further compressed and the hook 1466 is detached from the lowest groove 156 such that the inner supporting pole 15 can slide freely with respect to the outer shell 14 to adjust the relative positions therebetween. The user then can hold the supporting seat 154 of the inner supporting pole 15 and pull the inner supporting pole 15 to slide outwardly with respect to the outer shell 14 until the angle regulator 10 has a suitable length according to need of the user, as shown in FIG. 5. The hook 1466 is aligned with another higher groove 156 when the angle regulator 10 has the suitable length in FIG. 5. The user then can stop pressing on the press-button 1462 of the deflecting arm 146, so that the deflecting arm 146 can pivot anti-clockwise. When the spring 147 releases back to its natural state, the hook 1466 of deflecting arm 146 is received in the another higher groove 156 fittingly to thereby firmly fix the inner supporting pole 15 and the outer shell 14 to each other. In the present state, the angle regulator 10 has the suitable length longer than that in the initial state.

Contrarily, when it is needed to adjust the angle regulator 10 from the longer length, as shown in FIG. 5, to the shorter length as shown in FIG. 4, the working principle of the length adjusting process is substantially the same as described above, except that the inner supporting pole 15 is pushed to slide inwardly with respect to the outer shell 14 until the angle regulator 10 has a suitable shorter length according to need of the user.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An angle regulator for adjusting an angle between an equipment and a supporting surface on which the equipment is rested, the angle regulator comprising:

an outer shell and a deflecting arm received in the outer shell, the deflecting arm comprising a main rod, and a press-button and a hook respectively located at two opposite ends of the main rod, the press-button extending from the main rod and protruding out of the outer shell; and an inner supporting pole received in the outer shell, a plurality of spaced grooves being defined in the inner supporting pole along an axial direction thereof and engageable with said hook; wherein when the press-button is pressed, the hook is detached from one of the grooves that is engaged with the hook such that the inner supporting pole can slide with respect to the outer shell, and when the press-button is released, the hook is selectively engaged in another one of the grooves so that the inner supporting pole and the outer shell are fixed to each other; and wherein a fixing axle protrudes from an inner surface of the outer shell, the deflecting arm pivotally connected to the fixing axle and capable of pivoting around the fixing axle.

2. The angle regulator as described in claim 1, wherein the inner supporting pole comprises a main post received in an interior of the outer shell, the plurality of spaced grooves being defined in an outer surface of the main post.

3. The angle regulator as described in claim 2, wherein a supporting seat is formed in one end of the main post and protrudes out of the outer shell.

4. The angle regulator as described in claim 3, wherein an antiskid pad is provided at a bottom end of the supporting seat.

5. The angle regulator as described in claim 1, wherein an elastic member is located between the outer shell and the deflecting arm, one end of the elastic member being connected to the inner surface of the outer shell, and the other end of the elastic member being connected to a lower portion of the deflecting arm between the fixing axle and the hook.

6. The angle regulator as described in claim 1, wherein a hole corresponding to the press-button is defined in the outer shell for receiving the press-button, the press-button extending out of the outer shell through the hole.

7. An assembly, comprising:

an equipment defining at least one slot in a bottom surface thereof; and at least one angle regulator pivotably attached to the equipment, the at least one angle regulator being capable of pivoting with respect to the equipment from a closed position at which the at least one angle regulator is received in the at least one slot, to an opened position at which the at least one angle regulator is raised from the at least one slot for engaging with a supporting surface on which the equipment is rested to define an angle between the supporting surface and the equipment, the at least one angle regulator comprising an outer shell having a deflecting arm and an inner supporting pole received in the outer shell, a plurality of spaced grooves being defined in the inner supporting pole along an axial direction thereof, the deflecting arm comprising a main rod, and a press-button and a hook respectively located at two opposite ends of the main rod, the press-button protruding from the main rod and extending out of the outer shell the hook being engageable with said grooves;

wherein when the press-button is pressed, the hook is detached from one of the grooves that is engaged with the hook such that the inner supporting pole can slide with respect to the outer shell to adjust a length of the at least one angle regulator, and when the press-button is released, the hook is selectively engaged in another one of the grooves so that the inner supporting pole and the outer shell are fixed to each other.

8. The assembly as described in claim 7, wherein a pivot is formed in one end of the at least one slot, the at least one angle regulator defined with a pivot hole corresponding to the pivot, the at least one angle regulator pivotably connected to the pivot via the pivot hole.

9. The assembly as described in claim 7, wherein the equipment is a keyboard, and the at least one angle regulator has two in number, the two angle regulators located at a left side and a right side of the keyboard symmetrically and disposed adjacent to a rear end of the keyboard.

10. The assembly as described in claim 7, wherein the equipment is a notebook computer, and the at least one angle regulator has two in number, the two angle regulators located at a left side and a right side of the notebook computer symmetrically and disposed adjacent to a rear end of the notebook computer.

11. The assembly as described in claim 10, wherein the at least one slot communicates with an interior of the notebook computer.

12. The assembly as described in claim 7, wherein the inner supporting pole comprises a main post received in an interior of the outer shell, the plurality of spaced grooves being defined in an outer surface of the main post, a supporting seat being formed in one end of the main post and protruding out of the outer shell, the supporting seat having a larger size than the main post.

13. The assembly as described in claim 7, wherein a fixing axle protrudes from an inner surface of the outer shell and extends into an interior of the outer shell, the deflecting arm is pivotally connected to the fixing axle and capable of pivoting around the fixing axle, and an elastic member is compressively connected between the inner surface of the outer shell and a lower portion of the deflecting arm.

14. The assembly as described in claim 7, wherein a hole corresponding to the press-button is defined in the outer shell, the press-button extending out of the outer shell through the hole.

* * * * *